United States Patent Office 3,445,464
Patented May 20, 1969

3,445,464
PHENOTHIAZINE DERIVATIVES
Ernst Jucker, Ettingen, Anton Ebnöther, Reinach, Basel-Land, and Erwin Rissi, Basel, Switzerland, assignors to Sandoz Ltd. (also known as Sandoz A.G.), Basel, Switzerland
No Drawing. Filed May 8, 1967, Ser. No. 636,596
Claims priority, application Switzerland, May 10, 1966, 6,799/66; May 16, 1966, 7,081/66; Sept. 8, 1966, 13,014/66, 13,016/66; Mar. 8, 1967, 3,370/67, 3,371/67, 3,372/67
Int. Cl. C07d 93/14, 29/24; A61k 27/00
U.S. Cl. 260—243                                    29 Claims

ABSTRACT OF THE DISCLOSURE

The present invention provides compounds of formula:

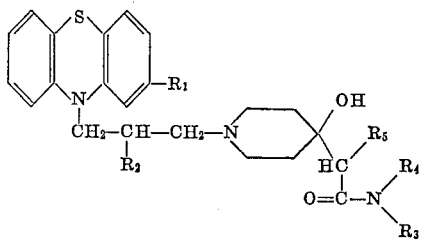

in which $R_1$ is hydrogen or halogen, acyl of 2 to 5 carbon atoms, alkoxy or alkylthio of 1 to 4 carbon atoms, or trifluoromethyl or cyano, $R_2$ is hydrogen or methyl, and either each of $R_3$ and $R_4$ is alkyl of 1 to 4 carbon atoms, or $R_3$ and $R_4$ together with the nitrogen are pyrrolidine, piperidine, morpholine or N-methyl-piperazine, and $R_5$ is hydrogen, or $R_3$ is alkyl of 1 to 4 carbon atoms, and $R_4$ together with $R_5$ is dimethylene, and the pharmaceutically acceptable acid addition salts thereof, which compounds are characterized by sedative and neuroleptic properties. The production of these compounds is furthermore described.

---

The present invention relates to new phenothiazine derivatives and processes for their production.
The present invention provides phenothiazine derivatives of general Formula I,

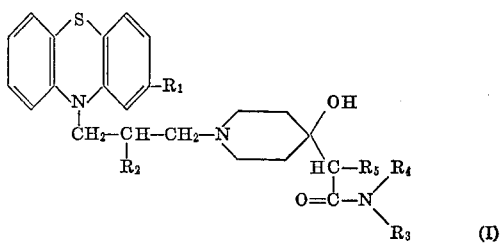

in which
$R_1$ signifies a hydrogen or halogen atom, an acyl radical containing 2 to 5 carbon atoms, an alkoxy or alkylthio radical containing 1 to 4 carbon atoms, or a trifluoromethyl or cyano radical,
$R_2$ signifies a hydrogen atom or a methyl radical, and either each of
$R_3$ and $R_4$ signifies an alkyl radical having 1 to 4 carbon atoms, or
$R_3$ and $R_4$ together with the nitrogen atom signify a pyrrolidine, piperidine, morpholine or N-methyl-piperazine radical, and
$R_5$ signifies a hydrogen atom, or
$R_3$ signifies an alkyl radical having 1 to 4 carbon atoms, and
$R_4$ together with $R_5$ signifies a dimethylene radical, and their acid addition salts.

The present invention further provides the following processes for the production of compounds of general Formula I and their acid addition salts:
(a) A compound of general Formula II,

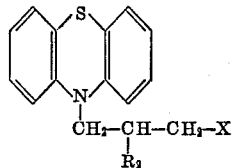

in which $R_1$ and $R_2$ have the above significance, and X signifies a chlorine, bromine or iodine atom or the radical of an organic sulphonic acid, is reacted with a compound of general Formula III,

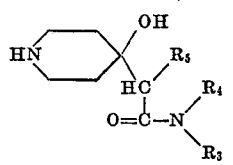

in which $R_3$, $R_4$ and $R_5$ have the above significance, in an organic solvent which is inert under the reaction conditions, in the presence of an acid binding agent at a temperature of 100° to 200° C., and when an acid addition salt is required, salification is effected.
(b) A compound of general Formula V,

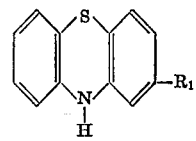

in which $R_1$ has the above significance, is condensed with a compound of general Formula VI,

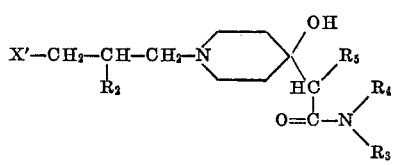

in which $R_2$, $R_3$, $R_4$ and $R_5$ have the above significance, and X' signifies a chlorine, bromine or iodine atom, in a solvent which is inert under the reaction conditions, in the presence of an alkali metal amide, and when an acid addition salt is required, salification is effected.
(c) A compound of general Formula VIII,

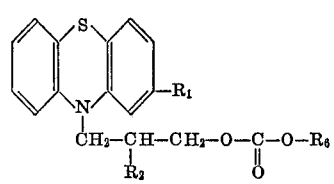

in which $R_1$ and $R_2$ have the above significance, and $R_6$ signifies an alkyl radical having 1 to 3 carbon atoms, is condensed with a compound of general Formula III at a temperature of 150° to 200° C., and when an acid addition salt is required, salification is effected.
(d) A compound of general Formula XI,

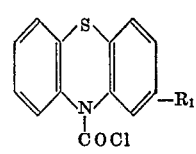

in which $R_1$ has the above significance, is reacted with a compound of general Formula XII,

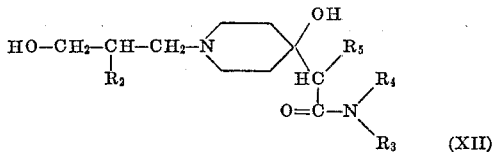

in which $R_2$, $R_3$, $R_4$ and $R_5$ have the above significance, in an organic solvent which is inert under the reaction conditions, in the presence of an acid binding agent, e.g., an alkali metal carbonate, and the resulting ester of general Formula XIII,

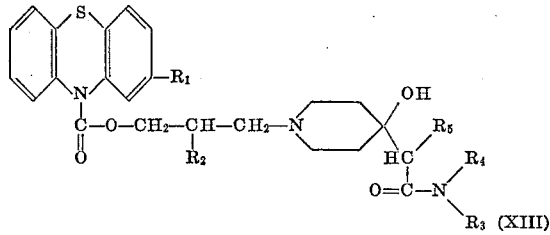

in which $R_1$ to $R_5$ have the above significance, is decarboxylated by heating, and when an acid addition salt is required, salification is effected.

The decarboxylation is preferably effected in the presence of a copper catalyst and optionally in a high-boiling organic solvent.

The present invention further provides a process for the production of compounds of general Formula Ia,

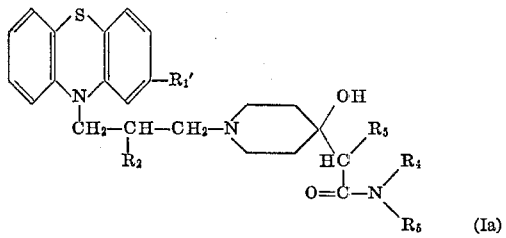

in which $R_1'$ signifies a hydrogen or halogen atom, an alkoxy or alkylthio radical containing 1 to 4 carbon atoms, or a trifluoromethyl radical, and $R_2$ to $R_5$ have the above significance, and their acid addition salts, characterized in that a compound of general Formula XV,

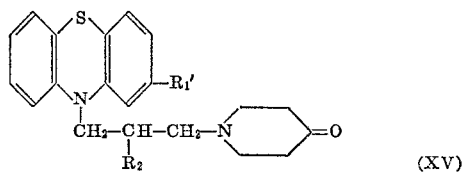

in which $R_1'$ and $R_2$ have the above significance, is reacted with a compound of general Formula IV,

in which $R_3$ to $R_5$ have the above significance, in a solvent which is inert under the reaction conditions, e.g., liquid ammonia, absolute ether or absolute dioxane or mixtures of the same, in the presence of an alkali metal amide, e.g., lithium amide, and the resulting complex is subsequently hydrolyzed, and when an acid addition salt is required, salification is effected.

One method of effecting the process (a) of the invention is as follows:

A compound of general Formula II in an anhydrous organic solvent, preferably absolute toluene or absolute xylene, is heated to the boil at normal pressure or optionally in a bomb tube to 130–180° C. with a compound of general Formula III while stirring for a prolonged period (10 to 50 hours). An inorganic or tertiary organic base or a second mol of a compound of general Formula III may be used as acid binding agent. The resulting product is isolated from the reaction mixture in manner known per se and purified by adsorption chromatography, crystallization or by conversion into a suitable salt.

The process (b) may, for example, be effected as follows: A compound of general Formula VI is added to a suspension of a compound of general Formula V and an alkali metal amide, e.g., sodium amide, in a solvent which is inert under the reaction conditions, e.g. liquid ammonia, absolute ether or absolute dioxane or mixtures of the same. After the reaction has been completed, the compound of general Formula I is isolated from the reaction mixture and purified in manner known per se.

The condensation indicated in the process (c) may optionally be effected in a suitable inert high boiling organic solvent having a boiling point within the required temperature range, and optionally in the presence of a catalytic amount of metallic sodium. The resulting products are isolated and purified in manner known per se.

The compounds of general Formula III used as starting materials are new and together with the process for their production, also form part of the present invention. They may be produced in that a compound of general Formula IV is reacted with 1-benzyl-4-piperidone in a solvent which is inert under the reaction conditions, e.g., liquid ammonia or absolute ether or absolute dioxane or mixtures of the same, in the presence of an alkali metal amide, e.g., lithium amide, the resulting reaction complex is decomposed by hydrolysis and the benzyl radical is split off from the resulting condensation product by hydrogenolysis. This is effected, for example, in that a compound of general Formula IV is slowly added to a suspension of lithium amide in liquid ammonia and after stirring for about half an hour 1-benzyl-4-piperidone is added dropwise thereto. After stirring for about two hours, the ammonia is allowed to evaporate, absolute ether is added to the residue and the mixture is stirred for 4 to 5 hours at the boiling temperature of the solvent to complete the reaction. The reaction complex is subsequently decomposed with an aqueous ammonium chloride solution with cooling, the ether phase is washed with water, dried and concentrated by evaporation.

The hydrogenolytic splitting off of the benzyl radical is effected in that the compound obtained as residue is hydrogenated, e.g., in glacial acetic acid over a palladium catalyst at about 50° C. in a pressure vessel at 6 atmospheres.

The compounds of general Formula II are known or may be obtained from the phenothiazines of general Formula V, e.g., by reacting with a correspondingly substituted 1,3-dihalogen-propane, or 3-halogen-1-propanol, in the presence of a strong base, e.g., sodium amide in liquid ammonia, and subsequently treating with 3-hydroxypropyl-phenothiazine obtained in the last named case with a suitable halogenating agent, e.g., thionyl chloride, phosphorus tribromide or p-toluene-, methane- or ethanesulphonyl chloride.

The compounds of general Formula VI used as starting materials are also new and together with the process for their production also form part of the present invention. They may be produced by reacting a compound of general Formula III with a compound of general Formula VII.

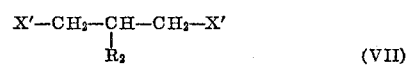

in which $R_2$ and $X'$ have the above significance, is an organic solvent which is inert under the reaction conditions, in the presence of an acid binding agent. This may, for example, be effected in that the compound of general Formula III is added to an organic solvent, e.g., benzene or its homologues, ammonia is passed in and the compound of general Formula VII is added. The reaction product is isolated and purified in manner known per se.

The compounds of general Formula VIII, used as starting materials, are also new and together with the process for their production also form part of the present invention. They may be produced by reacting a compound of general Formula IX,

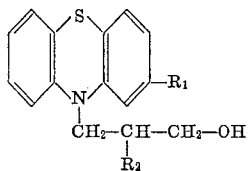

(IX)

in which $R_1$ and $R_2$ have the above significance, with a compound of general Formula X,

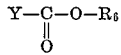

(X)

in which Y signifies a chlorine or bromine atom, and $R_6$ signifies an alkyl radical having 1 to 3 carbon atoms, in an organic solvent which is inert under the reaction conditions, in the presence of an acid binding agent.

Toluene may, for example, be used as solvent and an alkali metal alcoholate, e.g., sodium ethylate, an alkali metal carbonate or a tertiary organic base as acid binding agent. The reaction is preferably effected while heating to the boiling temperature of the solution.

The compounds of general Formula XII used as starting materials are also new and together with the process for their production, also form part of the present invention. They may be obtained by condensing a compound of general Formula III with a compound of general Formula XIV,

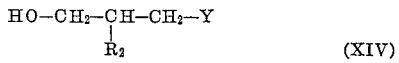

(XIV)

in which $R_2$ and Y have the above significance, in an organic solvent which is inert under the reaction conditions, in the presence of an acid binding agent, e.g., an alkali metal carbonate, a tertiary organic base or an alkoholate.

The compounds of the general Formulae IV, V, VII, IX, X, XI, XIV and XV used as starting materials are known or may be produced in manner known per se.

The compounds of general Formula I have hitherto not been described in the literature. They are basic compounds; with inorganic or organic acids they form stable salts which are crystalline at room temperature. Examples of acids for the formation of acid addition salts are: hydrochloric, hydrobromic, sulphuric, malonic, succinic, fumaric, hydrogenfumaric, maleic, tartaric, p-toluenesulphonic and methanesulphonic acid.

The compounds of general Formula I are characterized by sedative and neuroleptic properties, e.g., a narcosis potentiating effect, an inhibition of the conditioned and emotional reactions and of motor activity. A suitable daily dose of Compound I is 10-500 mg. The compounds of general Formula I may be used in internal medicine as sedatives, in the treatment of circulatory illnesses, especially hypertonic conditions and in the treatment of vegetative dystonias, in which case they are preferably used in the form of their physiologically tolerated, water-soluble salts.

The compounds of the invention may be used as pharmaceuticals on their own or in the form of appropriate medicinal preparations for administration, e.g. enterally or parenterally. In order to produce suitable medicinal preparations the compounds are worked up with inorganic or organic adjuvants which are inert and physiologically acceptable. Examples of such adjuvants are:

For tablets and dragees.—lactose, starch, talc and stearic acid.

For injectable solutions.—water, alcohols, glycerin and vegetable oils.

The preparations may furthermore contain suitable preserving, stabilizing and wetting agents, solubilizers, sweetening and colouring substances and flavourings.

The term "in manner known per se" as used herein designates methods in use or described in the literature on the subject.

In the following nonlimitative examples all temperatures are indicated in degrees centigrade; the melting and boiling points are uncorrected. The numbering of the phenothiazine structure is in accordance with the IUPAC regulations.

Example 1.—2-chloro-10-{3-[4-hydroxy-4-(1-methyl-2-oxo-3-pyrrolidinyl)piperidino]propyl}phenothiazine A mixture of 5.6 g. of 2-chloro-10-(3-chloropropyl)-phenothiazine and 7.2 g. of 4-hydroxy-4-(1-methyl-2-oxo-3-pyrrolidinyl)-piperidine in 40 ml. of xylene is heated in a bomb tube to 170° for 48 hours. The contents of the tube are flushed out with 100 ml. of benzene and washed with water until neutral. The organic phase is dried over sodium sulphate and evaporation to dryness is effected. The crystalline residue is taken up in 50 ml. of a mixture of benzene and petroleum ether (4:1), filtration is effected, the solvent is evaporated and the residue recrystallized from acetone/petroleum ether for further purification. Pure 2-chloro - 10 - {3-[4-hydroxy-4(1-methyl-2-oxo-3-pyrrolidinyl)piperidino]propyl}phenothiazine, having a melting point of 122–123°, is obtained.

The 4-hydroxy-4-(1-methyl-2-oxo-3-pyrrolidinyl)piperidine used as starting material may, for example, be produced as follows:

(a) 1 - benzyl-4-hydroxy-4-(1-methyl-2-oxo-3-pyrrolidinyl)piperidine.—1.4 g. of lithium are reacted in 300 ml. of liquid ammonia in the presence of iron-III-nitrate to give lithium amide. 20.8 g. of 1-methyl-2-pyrrolidone are subsequently added dropwise to this lithium amide suspension. The mixture is stirred during half an hour at the temperature of the liquid ammonia and 18.9 g. of 1-benzyl-4-piperidone are then slowly added dropwise. After stirring for 2 hours, the ammonia is allowed to evaporate and 500 ml. of absolute ether are added to the residue. Stirring is effected at the boil for 4½ hours and the reaction mixture is subsequently decomposed with 100 ml. of 10% ammonium chloride solution whilst cooling with ice. The ether phase is washed twice with water, dried over sodium sulphate and concentrated by evaporation. The residue is distilled at a strongly reduced pressure, whereby pure 1-benzyl-4-hydroxy-4-(1-methyl-2-oxo-3-pyrrolidinyl)piperidine distils over at 155–170°/ 10⁻⁴ mm. of Hg (temperature taken in the air bath).

(b) 4-hydroxy - 4 - (1-methyl-2-oxo-3-pyrrolidinyl)-piperidine.—11.8 g. of 1-benzyl-4-hydroxy-4-(1-methyl-2-oxo-3-pyrrolidinyl)piperidine are dissolved in 150 ml. of glacial acetic acid and hydrogenation is effected in the presence of 2.5 g. of a palladium catalyst (10% on charcoal) at an initial pressure of 6 atmospheres and a temperature of 50°. The calculated amount of hydrogen for the debenzylation is taken up after 4 hours. The catalyst is filtered off, the filtrate is evaporated to dryness and the residue is taken up in a 40% potassium carbonate solution and chloroform. Solid potassium carbonate is added to the aqueous phase until it is saturated or virtually so; extraction is effected several times with chloroform and the extracts which have been dried over sodium sulphate are concentrated by evaporation. The residue is distilled at a strongly reduced pressure, whereby pure 4 - hydroxy-4-(1-methyl-2-oxo-3-pyrrolidinyl)piperidine distils over at 120–140°/10⁻⁴ mm. of Hg (temperature taken in the air bath).

Example 2.—2-cyano-10-{3-[4-hydroxy-4-(1-methyl-2-oxo-3-pyrrolidinyl)piperidino]propyl}phenothiazine A mixture of 16.5 g. of 2-cyano-10-(3-chloropropyl)-phenothiazine, 10.9 g. of 4-hydroxy-4-(1-methyl-2-oxo-3- pyrrolidinyl)piperidine and 25.3 g. of potassium carbonate in 300 cc. of toluene is heated to the boil whilst stirring for 42 hours. The inorganic material is filtered off and the filtrate is washed with water until neutral. The organic layer is dried over magnesium sulphate and evaporated to dryness at reduced pressure at 60–70°. The resulting crude product is boiled in ether and the resulting crystalline mash filtered with suction. Purification is effected by recrystallizing once from acetone, whereby the pure 2-cyano - 10 - {3-[4-hydroxy-4-(1-methyl-2-oxo-3-pyrrolidinyl)piperidino]-propyl}phenothiazine, having a melting point of 152–153°, is obtained.

Example 3.—2-trifluoromethyl - 10 - {3-[4-hydroxy-4-(1-methyl - 2 - oxo - 3 - pyrrolidinyl)piperidino]propyl}-phenothiazine.

This compound is obtained from 13.3 g. of 2-trifluoromethyl-10-(3 - chloropropyl)phenothiazine, 7.7 g. of 4-hydroxy-4-(1-methyl-2-oxo-3-pyrrolidinyl)piperidine and 16.0 g. of potassium carbonate in 250 cc. of toluene, in a manner analogous to that described in Example 2. After recrystallization from acetone/ether the compound indicated in the heading has a melting point of 129.5 to 130.5°.

Example 4.—10-{3-[4-hydroxy-4-(1-methyl-2-oxo-3-pyrrolidinyl)piperidino]propyl}phenothiazine A mixture of 23.35 g. of 10-(3-chloropropyl)phenothiazine, 16.8 g. of 4-hydroxy-4-(1-methyl-2-oxo-3-pyrrolidinyl)piperidine and 35.2 g. of potassium carbonate is heated to the boil in 400 cc. of xylene whilst stirring for 15 hours. The inorganic material is filtered off and the filtrate washed with water until neutral. Drying is effected over magnesium sulphate, the solvent is evaporated at 60–70° and reduced pressure and the viscous residue is dissolved in toluene. Extraction is effected thrice with a 10% aqueous tartaric acid solution, the tartaric acid extracts are subsequently made alkaline with solid potassium carbonate and extraction is effected with benzene. The combined benzene extracts are dried over magnesium sulphate and concentrated by evaporation at 50° and reduced pressure. The resulting crude product is dissolved in acetone and the calculated amount of hydrobromic acid (33% in glacial acetic acid) is added. Evaporation to dryness is effected and the residue is recrystallized from a mixture of methanol and acetone. Melting point 185–187°.

Example 5.—2-bromo-10-{3-[4-hydroxy-4-(1-methyl-2-oxo-3-pyrrolidinyl)piperidino]propyl}phenothiazine A mixture of 20.45 g. of 2-bromo-10-(3-chloropropyl) phenothiazine, 11.42 g. of 4-hydroxy-4-(1-methyl-2-oxo-3-pyrrolidinyl)piperidine and 28.9 g. of potassium carbonate in 300 cc. of xylene is heated to the boil whilst stirring for 16 hours. Working up is effected in a manner analogous to that described in Example 4. The resulting 2 - bromo - 10 - {3-[4-hydroxy-4-(1-methyl-2-oxo-3-pyrrolidinyl)piperidino]propyl}phenothiazine has a melting point of 116–118° (from isopropanol).

Example 6.—2-acetyl-10-{3-[4-hydroxy-4-(1-methyl-2-oxo-3-pyrrolidinyl)piperidino]propyl}phenothiazine A mixture of 17.2 g. of 2-acetyl-10-(3-chloropropyl) phenothiazine, 10.7 g. of 4-hydroxy-4-(1-methyl-2-oxo-3-pyrrolidinyl)piperidine and 22.4 g. of potassium carbonate in 300 cc. of absolute xylene is heated to the boil whilst stirring for 18 hours. The inorganic material is filtered off, the filtrate is washed with water until neutral and the xylene phase is extracted thrice with a total of 1000 cc. of a 10% tartaric acid solution. The acid extracts are extracted once with ether and subsequently made alkaline by the addition of potassium carbonate. The liberated base is extracted with benzene, the benzene extracts are dried over magnesium sulphate and evaporated to dryness at 70 and reduced pressure.

The crude product is dissolved in benzene and chromatographed on 560 g. of aluminium oxide. Elution is first effected with benzene and then with a mixture of benzene/chloroform (7:3). The evaporation residue of the benzene/chloroform eluate is dissolved in acetone and converted into the hydrobromide by the addition of 95% of the calculated amount of 33% hydrogen bromide in glacial acetic acid. After recrystallizing twice from acetone, pure 2-acetyl-10-{3-[4-hydroxy-4-(1-methyl-2-oxo--3-pyrrolidinyl)piperindino]propyl}phenothiazine hydrobromide, having a melting point of 191–194°, is obtained.

The following compounds may be obtained in a manner analogous to that described in Example 6, except that the step of chromatographic purification is omitted:

Example 7.—2 - chloro - 10 - {3 - [4 - hydoxy - 4 - (1-methyl - 2 - oxo - 3 - pyrrolidinyl)piperidino]2 - methylpropyl}phenothiazine This compound is obtained from 16.8 g. of 2-chloro-10-(2-methyl-3-chloropropyl)phenothiazine, 10.3 g. of 4-hydroxy-4-(1-methyl-2-oxo-3-pyrrolidinyl)piperidine and 21.5 g. of potassium carbonate in 300 cc. of absolute xylene. The hydrogen maleate has a melting point of 121–125° (acetone/ether).

Example 8.—2 - methylmercapto-10-{3-[4-hydroxy-4-(1-methyl - 2 - oxo - 3 - pyrrolidinyl)piperidino]propyl} phenothiazine This compound is obtained from 12.4 g. of 2-methylmercapto-10-(3-chloropropyl)phenothiazine, 7.6 g. of 4-hydroxy-4-(1-methyl-2-oxo-3-pyrrolidinyl)piperidine and 16.0 g. of potassium carbonate in 250 cc. of absolute xylene. Clear, glassy mass.

Infrared spectrum ($CH_2Cl_2$) characteristic bands at 1667 cm.$^{-1}$ (C=O) and 3450 cm.$^{-1}$ (OH).

Ultraviolet spectrum ($CH_3OH$) absorption maxima at 263.5 m$\mu$ (log $\epsilon$ 4.56) and 315.5 m$\mu$ (log $\epsilon$ 3.64).

Example 9.—2-chloro-10-{3-[4-hydroxy-4-(1-ethyl-2-oxo-3-pyrrolidinyl)piperidino]propyl}phenothiazine This compound is obtained from 21.3 g. of 2-chloro-10-(3-mesyloxypropyl)phenothiazine, 12.2 g. of 4-hydroxy-4-(1-ethyl-2-oxo-3-pyrrolidinyl)piperidine and 23.8 g. of potassium carbonate in 250 cc. of absolute toluene. Clear, glassy mass.

Infrared spectrum ($CH_2Cl_2$) characteristic bands at 1662 cm.$^{-1}$ (C=O), 3400 cm.$^{-1}$ (OH).

Ultraviolet spectrum ($CH_3OH$) absorption maxima at 256.5 m$\mu$ (log $\epsilon$ 4.52), 311 m$\mu$ (log $\epsilon$ 3.62).

The 4-hydroxy-4-(1-ethyl-2-oxo-3-pyrrolidinyl)piperidine used as starting material may be produced as follows:

(a) 1 - benzyl - 4 - hydroxy - 4 - (1 - ethyl - 2 - oxo - 3-pyrrolidinyl)piperidine.—1.4 g. of lithium are reacted in 400 ml. of liquid ammonia in the presence of iron-III-nitrate to give lithium amide. 44.3 g. of 1-ethyl-2-pyrrolidone are then added dropwise to this lithium amide suspension. The mixture is stirred at the temperature of the liquid ammonia for half an hour and 18.9 g. of 1-benzyl-4-piperidone are then slowly added dropwise. After stirring for two hours, the ammonia is allowed to evaporate and 500 ml. of absolute ether are added to the residue. Stirring is effected at the boil for 4½ hours and the reaction mixture is subsequently decomposed with 100 ml. of a 10% ammonium chloride solution whilst cooling with ice. The ether phase is washed twice with water, dried over sodium sulphate and concentrated by evaporation. The residue is distilled at a strongly reduced pressure, whereby 1 - benzyl - 4 - hydroxy - 4 - (1 - ethyl - 2 - oxo - 3 - pyrrolidinyl)piperidine is obtained and may be used for the next reaction stage without further purification.

(b) 4 - hydroxy - 4 - (1 - ethyl - 2 - oxo - 3 - pyrrolidinyl)piperidine.—11.8 g. of 1 - benzyl-4-hydroxy-4-(1-ethyl-2-oxo-3-pyrrolidinyl)piperidine are dissolved in 150 ml. of glacial acetic acid and hydrogenation is effected in the presence of 2.5 g. of a palladium catalyst (10% on charcoal) at an initial pressure of 6 atmospheres and a temperature of 50°. The calculated amount of hydrogen for the debenzylation is taken up after 4 hours. The catalyst is filtered off, the filtrate is evaporated to dryness and the residue is taken up in a 40% aqueous potassium carbonate solution and chloroform. Solid potassium carbonate is added to the aqueous phase until it is saturated or virtually so; extraction is effected several times with chloroform and the extracts which have been dried over sodium sulphate are concentrated by evaporation. The residue is distilled at a strongly reduced pressure, whereby pure 4 - hydroxy - 4 - (1 - ethyl - 2 - oxo - 3 - pyrrolidinyl) piperidine distills over at 170–190°/0.08 mm. of Hg (temperature taken in the air bath).

Example 10.—2 - chloro - 10 - {3 - [4 - hydroxy - 4 - (1-isopropyl - 2 - oxo - 3 - pyrrolidinyl)piperidino]propryl}phenothiazine This compound is obtained from 10.4 g. of 2-chloro-10-(3-mesyloxypropyl)phenothiazine, 6.3 g. of 4-hydroxy-4-(1-isopropyl-2-oxo-3-pyrrolidinyl)piperidine and 11.6 g. of potassium carbonate in 150 cc. of absolute toluene. Clear, glassy mass.

Infrared spectrum ($CH_2Cl_2$) characteristic bands at 1658 cm.$^{-1}$ (C=O), 3400 cm.$^{-1}$ (OH).

Ultraviolet spectrum ($CH_3OH$) absorption maxima at 256.5 m$\mu$ (log $\epsilon$ 4.51), 306 m$\mu$ (log $\epsilon$ 3.63).

The 4-hydroxy - 4 - (1-isopropyl-2-oxo-3-pyrrolidinyl) piperidine used as starting material is produced in a manner analogous to that described in Examples 9a and 9b. Boiling point 159–160°/0.1 mm. of Hg.

Example 11.—2 - methoxy - 10 - {3 - [4 - hydroxy - 4 - (1-methyl - 2- oxo - 3 - pyrrolidinyl)piperidino]propyl} phenothiazine This compound is obtained from 15.3 g. of 2-methoxy-10-(3-chloropropyl)phenothiazine, 9.9 g. of 4-hydroxy-4-(1-methyl-2-oxo-3-pyrrolidinyl)piperidine and 20.7 g. of potassium carbonate in 250 cc. of absolute xylene. Clear, glassy mass.

Infrared spectrum ($CH_2Cl_2$) characteristic bands at 1667 cm.$^{-1}$ (C=O), 3400 cm.$^{-1}$ (OH).

Ultraviolet spectrum ($CH_3OH$) absorption maxima at 253.5 m$\mu$ (log $\epsilon$ 4.41) 308 mu (log $\epsilon$ 3.66).

Example 12.—2 - chloro - 10 - {3 - [4 - hydroxy - 4 - (1-methyl - 2 - oxo- 3 - pyrrolidinyl)piperidino]propyl} phenothiazine 11.9 g. of 2-chloro-phenothiazine are added portionwise to a suspension of sodium amide in liquid ammonia (produced from 2.4 g. of sodium in approximately 700 cc. of liquid ammonia), the reaction mixture is stirred for two hours and a solution of 14.0 g. of crude 1-(3-chloropropyl) - 4 - hydroxy - 4 - (1 - methyl - 2 - oxo - 3 -pyrrolidinyl)piperidine in 70 cc. of absolute benzene is then added dropwise. The ammonia is allowed to evaporate and 400 cc. of toluene are added, the reaction mixture is subsequently decomposed with 200 cc. of a 20% ammonium chloride solution whilst cooling with ice, the organic phase is separated and the aqueous layer is extracted once more with toluene. The combined toluene extracts are washed with water until neutral and extracted with a 10% tartaric acid solution. The acid extracts are made alkaline with potassium carbonate and the liberated base is extracted with benzene. After drying over magnesium sulphate the benzene is evaporated. After recrystallizing the residue from acetone, pure 2-chloro-10-{3-[4-hydroxy-4 - (1 - methyl - 2 - oxo - 3 - pyrrolidinyl)piperidino] propyl}phenothiazine, having a melting point of 122–124°, is obtained.

The 1 - (3 - chloropropyl) - 4 - hydroxy - 4 - (1 - methyl-2-oxo3-pyrrolidinyl)piperidine used as starting material is produced as follows:

Ammonia is pased through a solution of 19.8 g. of 4-hydrovy - 4 - (1-methyl-2-oxo-3-pyrrolidinyl)piperidine in 50 cc. of absolute benzene whilst cooling with ice and stirring vigorously and a solution of 31.5 g. of 1-bromo-3-chloropropane in 30 cc. of absolute benzene is simultaneously added dropwise. 20% hydrochloric acid is subsequently added until an acid reaction to Congo red is obtained, the aqueous phase is separated and is made alkaline by the addition of potassium carbonate. The liberated base is extracted with benzene. After drying the benzene extracts over magnesium sulphate and evaporating the solvent crude 1-(3-chloropropyl)4-hydroxy-4-(1-methyl-2-oxo-3-pyrrolidinyl)piperidine is obtained as a slightly yellow coloured oil.

Example 13.—2 - chloro - 10 - {3 - [4 - hydroxy - 4 - (1-methyl - 2 - oxo - 3 - pyrrolidinyl)piperidino]propyl} phenothiazine A mixture of 4.65 g. of 2-chloro-10-(3-ethoxycarbonyloxypropyl)phenothiazine and 2.54 g. of 4-hydroxy-4-(1-methyl-2-oxo-3-pyrrolidinyl)piperidine is heated to 180° for 6 hours. The contents of the flask are dissolved in benzene, extraction is effected several times with water and the further working up is continued in a manner analogous to that described in Example 12 (tartaric acid extraction). After recrystallizing the crude product from acetone, pure 2 - chloro - 10 - {3 - [4 - hydroxy - 4 - (1-methyl - 2 - oxo - 3 - pyrrolidinyl)piperidino]propyl} phenothiazine, having a melting point of 122–123.5°, is obtained.

The 2-chloro-10-(3-ethoxycarbonyloxypropyl)phenothiazine used as starting material is produced as follows:

A mixture of 29.2 g. of 2-chloro-10-(3-hydroxypropyl) phenothiazine, 10.8 g. of chloroformic acid ethyl ester and 6.8 g. of sodium ethylate in 400 cc. of absolute toluene is heated to the boil whilst stirring for 24 hours. Dilute hydrochloric acid is added until a weakly acid reaction is obtained and the organic phase is decanted and dried over magnesium sulphate. The solvent is evaporated and the residue chromatographed on a 20-fold quantity of aluminium oxide. Elution is effected with benzene/petroleum ether (1:4) whereby the crude 2-chloro-10-(3-ethoxycarbonyloxypropyl)phenothiazine is obtained as a viscous oil.

Example 14.—2-chloro-10-{3-[4-hydroxy-4-(1-methyl-2-oxo-3-pyrrolidinyl)piperidino]propyl}phenothiazine A mixture of 3.0 g. of 2-chloro-phenothiazine-10-carboxylic acid chloride, 2.6 g. of 1-(3-hydroxypropyl)-4-hydroxy-4-(1-methyl-2-oxo-3-pyrrolidinyl)piperidine and 4.1 g. of potassium carbonate in 100 cc. of absolute toluene is heated to the boil whilst stirring for 17 hours. The inorganic material is filtered off, the filtrate is extracted thrice with water, drying is effected over magnesium sulphate and the solvent is evaporated.

The residue is heated to 190° in a high vacuum in the presence of 0.5 g. of copper powder for 3 hours, the contents of the flask are subsequently taken up in 200 cc. of toluene, filtration is effected over Hyflo and the filtrate is extracted with water. The organic phase is dried over magnesium sulphate, evaporation to dryness is effected and after recrystallizing from acetone, pure 2-chloro-10-{3-[4-hydroxy-4-(1-methyl-2-oxo-3-pyrrolidinyl)piperidino]propyl}phenothiazine, having a melting point of 122–123.5°, is obtained.

The 1-(3-hydroxypropyl)-4-hydroxy-4-(1-methyl-2-oxo-3-pyrrolidinyl)piperidine used as starting material is produced as follows:

A mixture of 19.8 g. of 4-hydroxy-4-(1-methyl-2-oxo-3-pyrrolidinyl)piperidine, 13.9 g. of 1-bromo-3-propanol and 41.4 g. of potassium carbonate in 200 cc. of diethyl ketone is heated to the boil whilst stirring for 16 hours. The inorganic material is filtered off, the filtrate is evaporated to dryness and the residue is distilled in a high vacuum. Boiling point 200–210°/0.01 mm. of Hg.

Example 15.—2-chloro-10-{3-[4-hydroxy-4-(1-methyl-2-oxo-3-pyrrolidinyl)piperidino]propyl}phenothiazine A mixture of 18.1 g. of 2-chloro-10-[3-(4-oxopiperidino)propyl]phenothiazine [K. Stach et al., Monatsh. f.. Chemie 93, (1962), 1090] and 24.0 g. of 1-methyl-2-pyrrolidone is added dropwise to a suspension of lithium amide in liquid ammonia (produced from 0.7 g. of lithium in 400 cc. of liquid ammonia). After stirring for 3 hours, the ammonia is allowed to evaporate and 400 cc. of absolute toluene are added. Stirring is effected at room temperature for 17 hours and a 100° for 4 hours and the mixture is subsequently decomposed with 200 cc. of a 20% ammonium chloride solution. The toluene layer is separated, washed twice with water and after drying over magnesium sulphate is concentrated by evaporation. The residue is chromatographed on 390 g. of aluminium oxide. Unconverted starting material is eluted with benzene and 2-chloro-10-{3-[4-hydroxy-4-(1-methyl-2-oxo-3-pyrrolidinyl)piperidino]propyl}phenothiazine is eluted with benzene/chloroform (4:1). After recrystallization from acetone the compound has a melting point of 121–123°.

Example 16.—2 - chloro - 10 - {3-[4-(dimethylcarbamoylmethyl)-4-hydroxypiperidino]propyl}phenothiazine A mixture of 9.7 g. of 2-chloro-10-(3-chloropropyl)phenothiazine and 11.6 g. of 4-(dimethylcarbamoylmethyl)-4-hydroxy-piperidine in 40 ml. of xylene is heated to 170° in a bomb tube for 48 hours. The contents of the flask are flushed out with 100 ml. of benzene and washed with water until neutral. Drying is effected over sodium sulphate and the solvent is evaporated. The resulting residue is dissolved in 100 ml. of acetone, filtered over active charcoal and a hot solution of the calculated amount of fumaric acid in ethanol is added to the filtrate. After standing for a long time in a refrigerator, pure 2-chloro-10-{3-[4-(dimethylcarbamoylmethyl)-4-hydroxy-piperidino]propyl}phenothiazine hydrogen fumarate crystallizes. Melting point 197–200° (decomposition).

The 4-(dimethylcarbamoylmethyl)-4-hydroxy-piperidine used as starting material may, for example, be produced as follows:

(a) 1-benzyl-4-(dimethylcarbamoylmethyl)-4-hydroxypiperidine.—1.4 g. of lithium are reacted in 300 ml. of liquid ammonia in the presence of iron-III-nitrate to give lithium amide. 18.3 g. of N,N-dimethylacetamide are then added dropwise to this lithium amide suspension. The mixture is stirred at the temperature of the liquid ammonia for half an hour and 18.9 g. of 1-benzyl-4-piperidone are subsequently slowly added dropwise. After stirring for two hours 10 g. of ammonium chloride are carefully added, the ammonia is evaporated and 100 ml. of water are added to the residue whilst cooling with ice. Extraction is effected several times with benzene, the combined extracts are washed twice with water, drying is effected over sodium sulphate and the benzene is evaporated. The residue is distilled at a strongly reduced pressure, whereby pure 1-benzyl-4-(dimethylcarbamoylmethyl)-4-hydroxy-piperidine distills over at 164–167°/ 10⁻⁴ mm. of Hg.

(b) 4 - (dimethylcarbamoylmethyl) - 4-hydroxy-piperidine.—23.0 g. of 1-benzyl-4-(dimethylcarbamoylmethyl)-4-hydroxy-piperidine are dissolved in 170 ml. of glacial acetic acid and hydrogenation is effected in the presence of 4.5 g. of a palladium catalyst (10% on charcoal) at an initial pressure of 6 atmospheres and a temperature of 50°. The calculated amount of hydrogen for the debenzylation is taken up after 2 hours. The catalyst is filtered off, the filtrate is evaporated to dryness and the residue is taken up in a 40% aqueous potassium carbonate solution and chloroform. Solid potassium carbonate is added to the aqueous phase until it is saturated or virtually so; extraction is effected several times with chloroform and the extracts which have been dried over sodium sulphate are concentrated by evaporation. The residue is distilled at a strongly reduced pressure, whereby pure 4-(dimethylcarbamoylmethyl)-4-hydroxy-piperidine distills over at 140–160°/0.01 mm. of Hg (temperature taken in the air bath).

Example 17.—10-{3-[4-(dimethylcarbamoylmethyl)-4-hydroxy-piperidino]propyl}phenothiazine A mixture of 23.8 g. of 10-(3-chloropropyl)phenothiazine, 16.1 g. of 4-(dimethylcarbamoylmethyl)-4-hydroxy-piperidine and 35.8 g. of potassium carbonate in 400 cc. of xylene is heated to the boil whilst stirring for 15 hours. The inorganic material is filtered off and the filtrate is washed with water until neutral. The filtrate is subsequently dried over magnesium sulphate, is evaporated to dryness at 60–70° and the residue is dissolved in toluene. The solution is extracted thrice with a 10% tartaric acid solution, the tartaric acid extracts are made alkaline with solid potassium carbonate and extracted with benzene. The combined benzene extracts are dried over magnesium sulphate and concentrated by evaporation at 50° and reduced pressure. The resulting crude product is recrystallized once from benzene and then once more from acetone. Melting point 112–113.5°.

Example 18.—2 - bromo - 10-{3-[4-(dimethylcarbamoylmethyl)-4-hydroxy-piperidino]propyl}phenothiazine The compound indicated in the heading, having a melting point of 100–101° (from isopropanol) is obtained from 20.25 g. of 2-bromo-10-(3-chloropropyl)phenothiazine, 10.65 g. of 4-(dimethylcarbamoylmethyl)-4-hydroxy-piperidine and 23.7 g. of potassium carbonate in 300 cc. of xylene, in a manner analogous to that described in Example 17.

Example 19.—2 - methylmercapto-10-{3-[4-(dimethylcarbamoylmethyl) - 4 - hydroxy-piperidino]propyl}phenothiazine A mixture of 17.1 g. of 2-methylmercapto-10-(3-chloropropyl)phenothiazine, 9.9 g. of 4-(dimethylcarbamoylmethyl)-4-hydroxy-piperidine and 22.0 g. of potassium carbonate in 250 cc. of absolute xylene is heated to the boil whilst stirring for 16 hours. The inorganic material is filtered off, the filtrate is washed with water until neutral, drying is effected over magnesium sulphate and the solvent is evaporated at 60–70° and reduced pressure. The resulting crude base is converted into the hydrogen fumarate by dissolving in acetone, adding the calculated amount of fumaric acid, boiling for a short time and allowing to crystallize. After crystallizing the crude hydrogen fumarate from ethanol pure 2-methylmercapto-10 - {3 - [4-(dimethylcarbamoylmethyl)-4-hydroxypiperidino]propyl}phenothiazine hydrogen fumarate, having a melting point of 162–164°, is obtained.

The following compounds are obtained in a manner analogous to that described in Example 19:

Example 20.—2 - methoxy-10-{3-[4-(dimethylcarbamoylmethyl)-4-hydroxypiperidino]propyl}phenothiazine This compound is obtained from 15.3 g. of 2-methoxy-10-(3-chloropropyl)phenothiazine, 9.3 g. of 4-(dimethylcarbamoylmethyl)-4-hydroxy-piperidine and 20.7 g. of potassium carbonate in 250 cc. of absolute xylene. The hydrogen maleate has a melting point of 120–122° (acetone).

Example 21.—2 - chloro-10-{3-[4-hydroxy-4-(piperidinocarbonylmethyl)piperidino]propyl}phenothiazine This compound is obtained from 9.2 g. of 2-chloro-10-(3-mesyloxypropyl)phenothiazine, 5.6 g. of 4-hydroxy-4-(piperidinocarbonylmethyl)piperidine and 10.4 g. of potassium carbonate in 200 cc. of absolute toluene. The hydrogen maleate has a melting point of 162–165° (acetone/petroleum ether).

The 4 - hydroxy-4-(piperidino-carbonylmethyl)piperidine used as starting material is produced as follows:

(a) 1 - benzyl - 4 - hydroxy-4-(piperidinocarbonylmethyl)piperidine.—1.4 g. of lithium are reacted in 300 ml. of liquid ammonia in the presence of iron-III-nitrate to give lithium amide. 25.7 g. of 1-acetyl-piperidine are subsequently added dropwise to this lithium amide suspension, the mixture is stirred at the temperature of the liquid ammonia for half an hour and 18.9 g. of 1-benzyl-4-piperidone are then slowly added dropwise. After stirring for two hours, 10 g. of ammonium chloride are carefully added, the ammonia is evaporated and 100 cc. of water are added to the residue whilst cooling with ice. Extraction is effected several times with benzene, the combined extracts are washed twice with water, drying is effected over sodium sulphate and the benzene is evaporated. The crude 1 - benzyl-4-hydroxy-4-(piperidinocarbonylmethyl)piperidine obtained as residue is used for the next stage without further purification.

(b) 4 - hydroxy-4-(piperidinocarbonylmethyl)piperidine.—23.0 g. of 1-benzyl-4-hydroxy-4-(piperidinocarbonylmethyl)piperidine are dissolved in 170 ml. of glacial acetic acid and hydrogenation is effected in the presence of 4.5 g. of a palladium catalyst (10% on charcoal) at an initial pressure of 6 atmospheres and a temperature of 50°. The calculated amount of hydrogen for the debenzylation is taken up after 2 hours. The catalyst is filtered off, the filtrate is evaporated to dryness and the residue is taken up in a 40% aqueous potassium carbonate solution and chloroform. Solid potassium carbonate is added to the aqueous phase until it is saturated or virtually so; extraction is effected several times with chloroform and the extract which has been dried over sodium sulphate is concentrated by evaporation. The residue is distilled at a strongly reduced pressure, whereby pure 4-hydroxy-4-(piperidinocarbonylmethyl)piperidine distills over at 180–200°/0.1 mm. of Hg (temperature taken in the air bath).

Example 22.—2 - chloro-10-{3-[4-diethylcarbamoylmethyl)-4-hydroxy-piperidino]propyl}phenothiazine This compound is obtained from 18.5 g. of 2-chloro-10-(3-mesyloxypropyl)phenothiazine, 10.7 g. of 4-(diethylcarbamoylmethyl)-4-hydroxy-piperidine and 20.7 g. of potassium carbonate in 300 cc. of absolute toluene, in a manner analogous to that described in Example 16. The hydrogen fumarate has a melting point of 137–139° (acetone).

The 4 - (diethylcarbamoylmethyl)-4-hydroxy-piperidine used as starting material is produced in a manner analogous to that described in Examples 16a and b:

(a) 1 - benzyl-4-(diethylcarbamoylmethyl)-4-hydroxy-piperidine.—This compound is obtained from 4.2 g. of lithium in 700 cc. of liquid ammonia, 56.7 g. of 1-benzyl-4-piperidone and 69 g. of N,N-diethyl-acetamide. Boiling point 167–168/0.005 mm. of Hg.

(b) 4 - (diethylcarbamoylmethyl) - 4 - hydroxy-piperidine.—This compound is obtained from 51.4 g. of 1-benzyl - 4 - (diethylcarbamoylmethyl) - 4-hydroxy-piperidine in 450 cc. of glacial acetic acid, 5.2 g. of 10% palladium/charcoal at 21 atmospheres and 60° for 12 hours. Boiling point 121–123°/0.1 mm. of Hg.

Example 23.—2-trifluoromethyl-10-{3-[4-diethylcarbamoylmethyl)-4-hydroxypiperidino]propyl}phenothiazine This compound is produced from 13.2 g. of 2-trifluoromethyl-10-(3-mesyloxypropyl)phenothiazine, 7.0 g. of 4-(diethylcarbamoylmethyl)-4-hydroxy-piperidine and 13.6 g. of potassium carbonate in 250 ml. of absolute toluene, in a manner analogous to that described in Example 16. The hydrogen fumarate has a melting point of 153–155° (acetone).

Example 24.—2 - chloro-10-{3-[4-hydroxy-4-(4-methyl-1-piperazinyl - carbonylmethyl)piperidino]propyl}phenothiazine This compound is produced from 8.7 g. of 2-chloro-10-(3-mesyloxypropyl)phenothiazine, 5.7 g. of 4-hydroxy-4-(4 - methyl - 1-piperazinylcarbonylmethyl)piperidine and 9.7 g. of potassium carbonate in 200 cc. of absolute toluene, in a manner analogous to that described in Example 21. The dihydrobromide has a melting point of 247–249° (decomp.) (ethanol).

The 4 - hydroxy - 4 - (4 - methyl-1-piperazinylcarbonylmethyl)piperidine used as starting material is produced in a manner analogous to that described in Example 21, (a) and (b) by reaction of 4-methyl-1-acetyl-piperazine with 1-benzyl-4-piperidone and subsequent debenzylation. Boiling point 175–178°/0.08 mm. of Hg (hot air bath).

Example 25.—2 - chloro - 10-{3-[4-hydroxy-4-(1-pyrrolidinylcarbonylmethyl)piperidino]propyl}phenothiazine This compound is produced from 18.5 g. of 2-chloro-10-(3-mesyloxypropyl)phenothiazine, 10.6 g. of 4-hydroxy - 4 - (1 - pyrrolidinylcarbonylmethyl)piperidine and 20.6 g. of potassium carbonate in 200 cc. of absolute toluene, in a manner analogous to that described in Example 21. The hydrogen maleate has a melting point of 163–165° (acetone).

The 4 - hydroxy - 4 -(1 - pyrrolidinylcarbonylmethyl)piperidine used as starting material is obtained in a manner analogous to that described in Example 21a and b by reaction of 1-acetyl-pyrrolidine with 1-benzyl-4-piperidone and subsequent debenzylation. Boiling point 160–180°/0.09 mm. of Hg (hot air bath).

Example 26.—2 - chloro-10-{3-[4-hydroxy-4-morpholinocarbonylmethyl)piperidino]propyl}phenothiazine This compound is produced from 43.8 g. of 2-chloro-10 - (3 - mesyloxypropyl)phenothiazine, 27.1 g. of 4 - hydroxy-4-(morpholinocarbonylmethyl)piperidine and 49.2 g. of potassium carbonate in 1000 cc. of absolute toluene, in a manner analogous to that described in Example 21. The hydrogen fumarate has a melting point of 159–162° (acetone).

The 4 - hydroxy - 4-(morpholinocarbonylmethyl)piperidine used as starting material is produced in a manner analogous to that described in Example 21a and b by reaction of 1-acetyl-morpholine and 1-benzyl-4-piperidone and subsequent debenzylation. The base is reacted as crude product. The hydrogen maleate has a melting point of 151–152° (from ethanol/ether).

Example 27.—2 - acetyl - 10-{3 - [4-(dimethylcarbamoylmethyl)-4-hydroxypiperidino]propyl}phenothiazine A mixture of 17.2 g. of 2-acetyl-10-(3-chloropropyl)-phenothiazine, 10.0 g. of 4-(dimethylcarbamoylmethyl)-4-hydroxy-piperidine and 22.4 g. of potassium carbonate in 350 cc. of absolute xylene is heated to the boil whilst stirring for 18 hours. The inorganic material is filtered off and the filtrate is washed with water until neutral. Extraction is subsequently effected thrice with a total of 1000 cc. of a 10% tartaric acid solution, the acid extracts are extracted once with ether and then made alkaline by the addition of potassium carbonate. The liberated base is extracted with benzene, drying over magnesium sulphate and evaporation to dryness are effected. After recrystallizing the resulting residue from ethyl acetate/pentane pure 2 - acetyl - 10-{3-[4-dimethylcarbamoylmethyl) - 4 - hydroxypiperidino]propyl}phenothiazine, having a melting point of 98–101° (sintering at 85°), is obtained.

The following compounds are produced in a manner analogous to that described in Example 27.

Example 28.—2-cyano-10-{3-[4-dimethylcarbamoylmethyl)-4-hydroxypiperidino]propyl}phenothiazine This compound is produced from 15.6 g. of 2-cyano-10-(3-chloropropyl)phenothiazine, 9.7 g. of 4-(dimethylcarbamoylmethyl) - 4 - hydroxy - piperidine and 21.6 g. of potassium carbonate in 300 cc. of absolute xylene. Melting point 125.5–126.5° (from isopropanol).

Example 29.—2 - trifluoromethyl - 10-{3-[4-(dimethylcarbamoylmethyl) - 4 - hydroxypiperidino]propyl}phenothiazine This compound is produced from 17.2 g. of 2-trifluoromethyl-10-(3-chloropropyl)phenothiazine, 9.3 g. of 4-(dimethylcarbamoylmethyl) - 4-hydroxy-piperidine and 20.7 g. of potassium carbonate in 300 cc. of absolute xylene. Melting point 120.5–121.5° (from isopropanol).

Example 30.—2 - chloro - 10-{3-[4-(dimethylcarbamoylmethyl) - 4-hydroxypiperidino]-2-methylpropyl}phenothiazine A mixture of 33.4 g. of 2-chloro-10-(2-methyl-3-chloropropyl)phenothiazine and 38.4 g. of 4-(dimethylcarbamoylmethyl)-4-hydroxy-piperidine in 500 cc. of absolute xylene is heated to 170° in an autoclave for 48 hours. The contents of the autoclave are washed with water until neutral and subsequently worked up in a manner analogous to that described in Example 27. The hydrogen maleate has a melting point of 196–198° (ethanol).

Example 31.—2-chloro-10-{3 - [4 - (dimethylcarbamoylmethyl)-4-hydroxypiperidino]propyl}phenothiazine 11.7 g. of 2-chloro-phenothiazine are added portionwise to a suspension of sodium amide in liquid ammonia (produced from 2.3 g. of sodium in 400 ml. of liquid ammonia). The reaction mixture is stirred for two hours and a solution of 13.2 g. of crude 1-(3-chloropropyl)-4-(dimethylcarbamoylmethyl)-4 - hydroxy-piperidine in 70 cc. of absolute benzene is subsequently added dropwise. The ammonia is allowed to evaporate, 400 cc. of toluene are added, the mixture is decomposed with about 200 cc. of a 20% ammonium chloride solution whilst cooling with ice, the organic phase is separated and the aqueous layer is extracted once more with toluene. The combined toluene extracts are washed with water until neutral and then extracted with a 10% tartaric acid solution. The acid extracts are made alkaline with potasseium carbonate and the liberated base is extracted with benzene. The organic phase is dried over magnesium sulphate and the benzene is evaporated. The resulting residue is dissolved in 100 ml. of acetone and a hot solution of the calculated amount of fumaric acid in ethanol is added to the filtrate. After standing for a long time in a refrigerator pure 2-chloro-10 - {3 - [4 - (dimethylcarbamoylmethyl) - 4 - hydroxypiperidino]propyl}phenothiazine hydrogen fumarate crystallizes. Melting Point 197–200° (decomposition).

The 1-(3-chloropropyl)-4-(dimethylcarbamoylmethyl)-4-hydroxy-piperidine used as starting material may, for example, be produced as follows:

Ammonia is passed through a solution of 18.6 g. of 4-(dimethylcarbamoylmethyl)-4-hydroxy - piperidine in 50 cc. of absolute benzene whilst cooling with ice and stirring vigorously and a solution of 31 g. of 1-bromo-3-chloropropane in 30 cc. of absolute benzene is simultaneously added dropwise. 20% hydrochloric acid is subsequently added until an acid reaction to Congo red is obtained, the aqueous phase is separated and made alkaline by the addition of potassium carbonate. The liberated base is extracted with benzene and the extract dried over magnesium sulphate. After evaporating the solvent crude 1 - (3 - chloropropyl) - 4 - (dimethylcarbamoylmethyl)-4-hydroxy-piperidine is obtained.

Example 32.—2-chloro-10-{3-[4-(dimethylcarbamoylmethyl)-4-hydroxypiperidino]propyl}phenothiazine A mixture of 36.3 g. of 2-chloro-10-(3-ethoxycarbonyloxypropyl)phenothiazine and 18.6 g. of 4-(dimethylcarbamoylmethyl)-4-hydroxy-piperidine is heated to 180° for 6 hours. The contents of the flask are dissolved in benzene, extraction is effected several times with water and the process is continued as indicated in Example 31 (tartaric acid extraction and following steps). 2-chloro-10-{3-[4-(dimethylcarbamoylmethyl) - 4 - hydroxypiperidino]propyl}phenothiazine hydrogen fumarate, having a melting point of 197–200° (decomposition), is obtained.

Example 35.—2-chloro-10-{3-[4-(dimethylcarbamoylmethyl)-4-hydroxypiperidino]propyl}phenothiazine A mixture of 18.6 g. of 2-chloro-10-[3-(4-oxopiperidino)-propyl]phenothiazine [K. Stach et al., Monatsh. f. Chemie 93, (1962), 1090] and 17.4 g. of N,N-dimethylacetamide is added dropwise to a suspension of lithium amide in liquid ammonia (produced from 0.7 g. of lithium in 400 cc. of liquid ammonia). After stirring for 3 hours, the ammonia is allowed to evaporate and 400 cc. of absolute toluene are added. Stirring is then effected at room temperature for 17 hours and at 100° for 4 hours and the mixture is subsequently decomposed with 200 cc. of a 20% ammonium chloride solution. The toluene layer is separated, washed twice with water and after drying over magnesium sulphate is concentrated by evaporation. The resulting crude product is dissolved in acetone and a hot solution of the calculated amount of fumaric acid in ethanol is added. After standing for a long time in a refrigerator pure 2-chloro-10-{3-[4 - (dimethcarbamoylmethyl)-4 - hydroxypiperidino]propyl}phenothiazine hydrogen fumarate, having a melting point of 197–200° (decomposition), crystallizes.

What is claimed is:

1. A compound selected from the group consisting of a compound of formula:

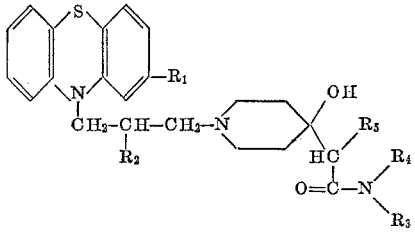

in which $R_1$ is hydrogen or halogen, akanoyl of 2 to 5 carbon atoms, alkoxy or alkylthio of 1 to 4 carbon atoms, or trifluoromethyl or cyano, $R_2$ is hydrogen or methyl, and either each of $R_3$ and $R_4$ is alkyl of 1 to 4 carbon atoms, or $R_3$ and $R_4$ together with the nitrogen are pyrrolidine, piperidine, morpholine or N-methyl-piperazine, and $R_5$ is hydrogen, or $R_3$ is alkyl of 1 to 4 carbon atoms, and $R_4$ together with $R_5$ is dimethylene, and a pharmaceutically acceptable acid addition salt thereof.

2. A compound according to claim 1, in which the compound is selected from the group consisiting of 2-chloro - 10 - {3 - [4 - hydroxy - 4 - (1 - methyl - 2 - oxo-3 - pyrrolidinyl)piperidino]propyl}phenothiazine and a pharmaceutically acceptable acid addition salt thereof.

3. A compound according to claim 1, in which the compound is selected from the group consisting of 2-cyano - 10 - {3 - [4 - hydroxy - 4 - (1 - methyl - 2 - oxo - 3-pyrrolidinyl)piperidino]propyl} - phenothiazine and a phamaceutically acceptable acid addition salt thereof.

4. A compound according to claim 1, in which the compound is selected from the group consisting of 2-trifluoromethyl - 10 - {3 - [4-hydroxy-4-(1-methyl-2-oxo-3-pyrrolidinyl)-piperidino]propyl}phenothiazine and a pharmaceutically acceptable acid addition salt thereof.

5. A compound according to claim 1, in which the compound is selected from the group consisting of 10-{3-[4-hydroxy-4-(1-methyl-2-oxo-3 - pyrrolidinyl) - piperidino]propyl}phenothiazine and a pharmaceutically acceptable acid addition salt thereof.

6. A compound according to claim 1, in which the compound is selected from the group consisting of 2-bromo - 10 - {3 - [4-hydroxy-4-(1-methyl-2-oxo-3-pyrrolidinyl)piperidino]propyl}phenothiazine and a pharmaceutically acceptable acid addition salt thereof.

7. A compound according to claim 1, in which the compound is selected from the group consisting of 2-acetyl - 10 - {3 - [4-hydroxy-4-(1-methyl-2-oxo-3-pyrrolidinyl-piperidino]propyl}phenothiazine and a pharmaceutically acceptable acid addition salt thereof.

8. A compound according to claim 1, in which the compound is selected from the group consisting of 2-chloro - 10 - {3 - [4-hydroxy-4-(1-methyl-2-oxo-3-pyrrolidinyl)piperidino]-2 - methylpropyl}phenothiazine and a pharmaceutically acceptable acid addition salt thereof.

9. A compound according to claim 1, in which the compound is selected from the group consisting of 2-methylmercapto-10-{3-[4-hydroxy-4(1-methyl-2 - oxo - 3-pyrrolidinyl)piperidino]propyl}phenothiazine and a pharmaceutically acid addition salt thereof.

10. A compound according to claim 1, in which the compoudn is selected from the group consisting of 2-chloro - 10 - {3 - [4 - hydroxy-4-(1-ethyl-2-oxo-3-pyrrolidinyl)piperidino]propyl}phenothiazine and a pharmaceutically acceptable acid addition salt thereof.

11. A compound according to claim 1, in which the compound is selected from the group consisting of 2-chloro - 10 - {3-[4-hydroxy-4-(1-isopropyl-2-oxo-3-pyrrolidinyl)piperidino]propyl}phenothiazine and a pharmaceutically acceptable acid addition salt thereof.

12. A compound according to claim 1, in which the compound is selected from the group consisting of 2-methoxy-10-{3-[4-hydroxy-4-(1-methyl-2-oxo - 3 - pyrrolidinyl)piperidino]propyl}phenothiazine and a pharmaceutically acceptable acid addition salt thereof.

13. A compound according to claim 1, in which the compound is selected from the group consisting of 2-chloro - 10-{3-[4-(dimethylcarbamoylmethyl)-4-hydroxy-piperidino]propyl}phenothiazine and a pharmaceutically acceptable acid addition salt thereof.

14. A compound according to claim 1, in which the compound is selected from the group consisting of 10-{3-[4-(dimethylcarbamoylmethyl) - 4 - hydroxy - piperidino] propyl}phenothiazine and a pharmaceutically acceptable acid addition salt thereof.

15. A compound according to claim 1, in which the compound is selected from the group consisting of 2-bromo-10-{3-[4-(dimethylcarbamoylmethyl)-4 - hydroxy-piperidino]propyl}phenothiazine and a pharmaceutically acceptable acid addition salt thereof.

16. A compound according to claim 1, in which the compound is selected from the group consisting of 2-methylmercapto - 10-{3-[4-(dimethylcarbamoylmethyl)-4-hydroxy-piperidino]propyl}phenothiazine and a pharmaceutically acceptable acid addition salt thereof.

17. A compound according to claim 1, in which the compound is selected from the group consisting of 2-methoxy - 10 - {3 - [4-(dimethylcarbamoylmethyl)-4-hydroxy-piperidino]propyl}phenothiazine and a pharmaceutically acceptable acid addition salt thereof.

18. A compound according to claim 1, in which the compound is selected from the group consisting of 2-chloro - 10-{3-[4-hydroxy-4-(piperidinocarbonylmethyl) piperidino]propyl}phenothiazine and a pharmaceutically acceptable acid addition salt thereof.

19. A compound according to claim 1, in which the compound is selected from the group consisting of 2-chloro - 10 - {3 - [4-diethylcarbamoylmethyl)-4-hydroxy-piperidino]propyl}phenothiazine and a pharmaceutically acceptable acid addition salt thereof.

20. A compound according to claim 1, in which the compound is selected from the group consisting of 2-trifluoro-methyl-10-{3-[4-(diethylcarbamoylmethyl)-4 - hydroxy-piperidino]propyl}phenothiazine and a pharmaceutically acceptable acid addition salt thereof.

21. A compound according to claim 1, in which the compound is selected from the group consisting of 2-chloro - 10-{3-[4-hydroxy-4-(4-methyl-1-piperazinyl-carbonylmethyl) - piperidino]propyl}phenothiazine and a pharmaceutically acceptable acid addition salt thereof.

22. A compound according to claim 1, in which the compound is selected from the group consisting of 2-chloro - 10 - {3 - [4 - hydroxy-4-(1-pyrrolidinylcarbonylmethyl)piperidino]propyl}phenothiazine and a pharmaceutically acceptable acid addition salt thereof.

23. A compound according to claim 1, in which the compound is selected from the group consisting of 2-chloro - 10-{3-[4-hydroxy-4-(morpholinocarbonylmethyl) piperidino]propyl}phenothiazine and a pharmaceutically acceptable acid addition salt thereof.

24. A compound according to claim 1, in which the compound is selected from the group consisting of 2--acetyl - 10-{3-[4-(dimethylcarbamoylmethyl)-4-hydroxy-piperidino]propyl}phenothiazine and a pharmaceutically acceptable acid addition salt thereof.

25. A compound according to claim 1, in which the compound is selected from the group consisting of 2-cyano-10-{3-[4-dimethylcarbamoylmethyl) - 4 - hydroxy-piperidino]propyl}phenothiazine and a pharmaceutically acceptable acid addition salt thereof.

26. A compound according to claim 1, in which the compound is selected from the group consisting of 2-trifluoromethyl-10-{3-[4-(dimethylcarbamoylmethyl)-4 - hydroxy-piperidino]propyl}phenothiazine and a pharmaceutically acceptable acid addition salt thereof.

27. A compound according to claim 1, in which the compound is selected from the group consisting of 2-chloro-10-{3-[4-(dimethylcarbamoylmethyl)-4 - hydroxy-piperidino]-2-methyl-propyl}phenothiazine and a pharmaceutically acceptable acid addition salt thereof.

28. A compound selected from the group consisting of a compound of formula:

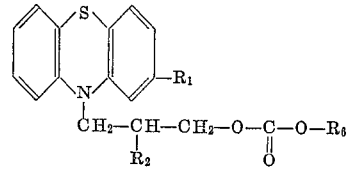

in which $R_1$ is hydrogen or halogen, alkanoyl of 2 to 5 carbon atoms, alkoxy or alkylthio of 1 to 4 carbon atoms, or trifluoromethyl or cyano, $R_2$ is hydrogen or methyl, and $R_6$ is alkyl of 1 to 3 carbon atoms.

29. 2 - chloro-10-(3-ethoxycarbonyloxypropyl)phenothiazine.

References Cited

UNITED STATES PATENTS 3,313,810   4/1967   Nakanishi et al. _____ 260—243

HENRY R. JILES, *Primary Examiner.*

HARRY I. MOATZ, *Assistant Examiner.*

U.S. Cl. X.R.

260—294, 294.7; 424—247

PO-1050
(5/69)

UNITED STATES PATENT OFFICE
CERTIFICATE OF CORRECTION

Patent No. 3,445,464     Dated May 20, 1969

Inventor(s) Ernst JUCKER et al.

It is certified that error appears in the above-identified patent and that said Letters Patent are hereby corrected as shown below:

In the Letters Patent - Col. 2, lines 5-10, the formula should be corrected from

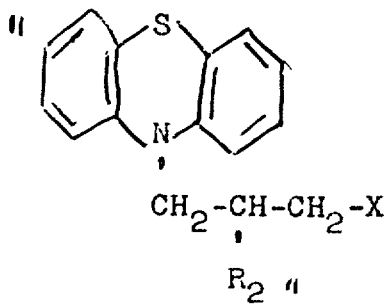

to (see page 2, line 4 of Specification)

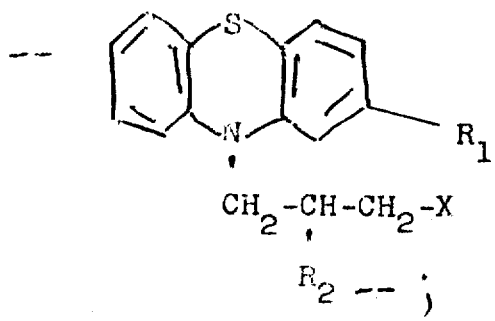

In the Letters Patent - col. 3, line 42, change "$R_5$" to --$R_3$-- see page 4, line 12 of Specification

SIGNED AND
SEALED
MAR 24 1970

(SEAL)
Attest:

Edward M. Fletcher, Jr.
Attesting Officer

WILLIAM E. SCHUYLER, JR.
Commissioner of Patents